United States Patent
Kairali et al.

(10) Patent No.: US 12,261,828 B2
(45) Date of Patent: Mar. 25, 2025

(54) MODIFYING SECURITY OF MICROSERVICES IN A CHAIN BASED ON PREDICTED CONFIDENTIAL DATA FLOW THROUGH THE MICROSERVICES

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 18/063,095

(22) Filed: Dec. 8, 2022

(65) Prior Publication Data
US 2024/0195787 A1 Jun. 13, 2024

(51) Int. Cl.
*H04L 9/40* (2022.01)
*G06F 21/10* (2013.01)

(52) U.S. Cl.
CPC ...... *H04L 63/0414* (2013.01); *G06F 21/1064* (2023.08)

(58) Field of Classification Search
CPC . H04L 63/0414; H04L 63/105; H04L 63/102; H04L 63/108; G06F 21/1064; G06F 21/50; G06F 21/53; G06F 21/54
See application file for complete search history.

(56) References Cited

U.S. PATENT DOCUMENTS

| | | | |
|---|---|---|---|
| 12,045,839 B1* | 7/2024 | Mishra | G06Q 30/0254 |
| 2019/0102157 A1* | 4/2019 | Caldato | G06F 11/3644 |
| 2019/0171447 A1* | 6/2019 | Lepcha | G06F 9/5066 |
| 2019/0273746 A1 | 9/2019 | Coffing | |
| 2020/0296172 A1 | 9/2020 | Gunjal et al. | |
| 2021/0306321 A1* | 9/2021 | Calegari | H04L 63/108 |
| 2021/0312277 A1* | 10/2021 | Prabhudesai | G06F 11/3466 |
| 2024/0015080 A1* | 1/2024 | Illikkal | H04L 41/5019 |
| 2024/0330093 A1* | 10/2024 | Shwartz | G06F 11/079 |

FOREIGN PATENT DOCUMENTS

WO 2022019983 A1 1/2022

OTHER PUBLICATIONS

Acquaviva et al., Fater Microservice-to-Microservice encrypted communication with Kong Mesh and Intel, URL: https://networkbuilders.intel.com/blog/faster-microservice-to-microservice-encrypted-communication-with-kong-mesh-and-intel, Last Updated: Sep. 27, 2021, 8 pages.

(Continued)

*Primary Examiner* — Shaqueal D Wade-Wright
(74) *Attorney, Agent, or Firm* — James Olsen

(57) ABSTRACT

A method for protecting data from a user that traverses through a chain of microservices include retrieving information identifying the chain of microservices associated with a user identifier of the user and a time when the user provided data to the chain of microservices. A level of confidentiality stored in association with the user identifier and with the time is retrieved. One or more security measures corresponding to the stored level of confidentiality are implemented for each microservice of the chain of microservices during the time.

20 Claims, 4 Drawing Sheets

(56) References Cited

OTHER PUBLICATIONS

Anonymous, Intelligent Fast Forwarding of the Usual Suspects in a Microservice Chain Based on Minimum Data Dimensions, IP.com No. IPCOM000268436D, IP.com Electronic Publication Date: Jan. 30, 2022, 4 pages.
Boldon James, Automated Data Classification, URL: https://www.boldonjames.com/data-classification/automated-classification/, 2022, printed Aug. 12, 2022, 4 pages.
Chetan Conikee, GDPR and Data Leakage: How Semantic Graphing Can Help, dated Aug. 16, 2018, 1 page.
Ilia Sotnikov, Data Classification: What It Is and How to Implement It, netwrix blog, URL: https://blog.netwrix.com/2020/09/02/data-classification/, published Sep. 2, 2020, Updated Jan. 13, 2022, 25 pages.

\* cited by examiner

MODIFYING SECURITY OF MICROSERVICES IN A CHAIN BASED ON PREDICTED CONFIDENTIAL DATA FLOW THROUGH THE MICROSERVICES

BACKGROUND

Field of the Invention

The field of the invention is data processing, or, more specifically, methods, apparatus, and products for modifying security of microservices based on predicted flow of confidential data through the microservices.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In a cloud-based computing environment, multiple users may connect to an application executing on a server. However, different users have different levels of access to confidential data in a particular application. For example, different data accessible through an application has different levels of confidentiality, with a type of security applied to a data item based on a level of confidentiality for the data item.

However, applying security measures to a data item consumes computational resources for the security measures. Security measures applied to a data item are related to a level of confidentiality of the data item. So increased security measures are applied to data items having higher levels of confidentiality. While increased security measures provide increased protection from unauthorized access to or modification of a data item, maintaining increased security measures involves an increased amount of computational resources.

SUMMARY

Methods and systems for protecting data from a user that traverses through a chain of microservices include retrieving information identifying the chain of microservices associated with a user identifier of the user and a time when the user provided data to the chain of microservices. A level of confidentiality stored in association with the user identifier and with the time is retrieved. One or more security measures corresponding to the stored level of confidentiality are implemented for each microservice of the chain of microservices during the time.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
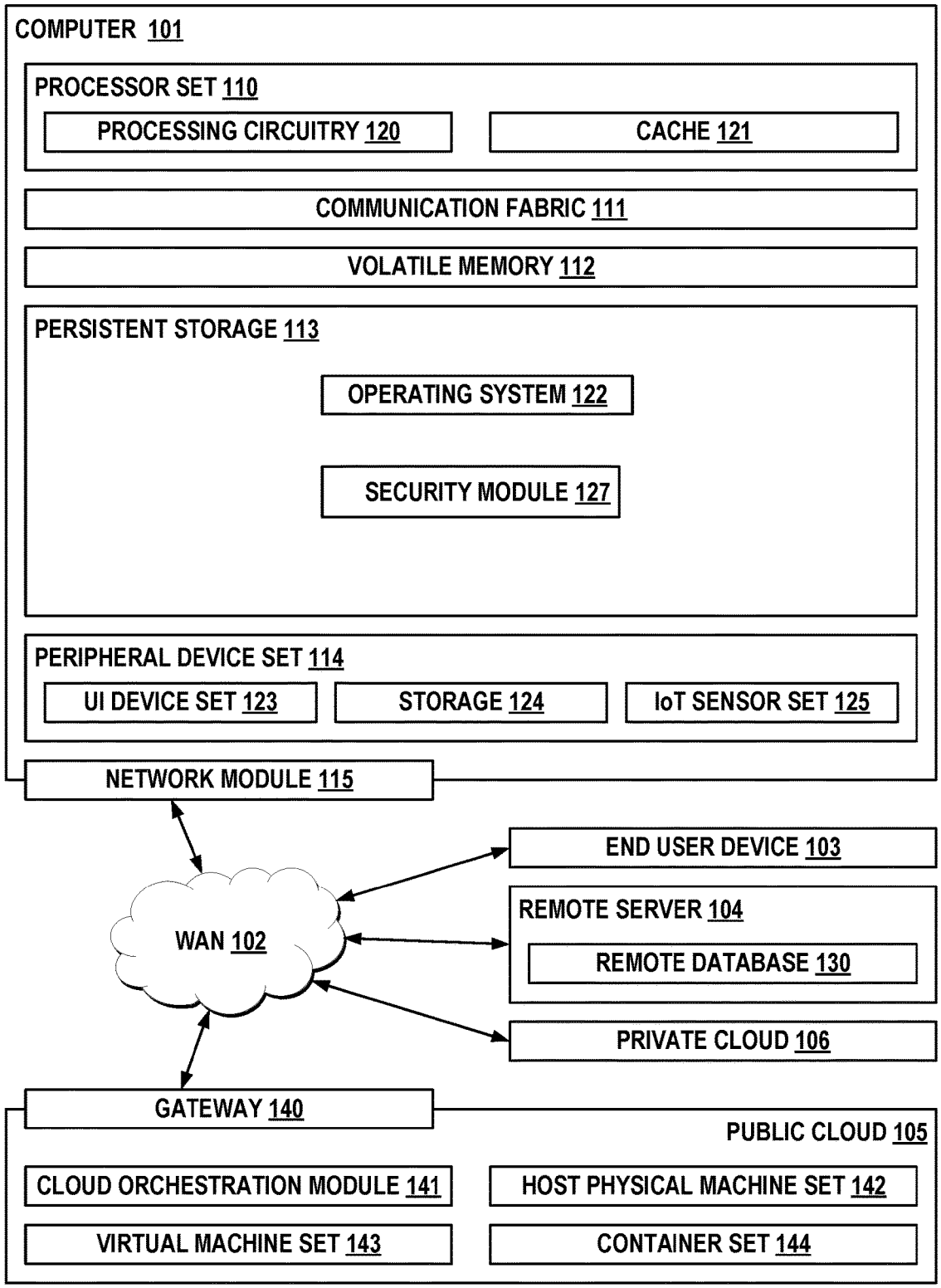
FIG. 1 is a block diagram of an example computing environment, according to some embodiments of the present disclosure.

Computing environment 100 shown in FIG. 1 contains an example of an environment for the execution of at least some of the computer code involved in performing the inventive methods, such as security module 127. In addition to security module 127, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and security module 127, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Computing environment 100 contains an example of an environment for the execution of at least some of the computer code involved in performing the inventive methods, such as the security module 127. The security module 127 includes instructions and data for identifying one or more chains of microservices for a user and predicting times when a user provides confidential data to a chain of microservices. The security module 127 also includes instructions that increase security measures applied to a chain of microservices during a predicted time interval when a user provides confidential data to the chain of microservices and that decrease security measures applied to the chain of microservices after the predicted time interval. Additionally, the security module 127 includes instructions that increase a security level of each microservice in a chain when a microservice in the chain receives confidential information and decreases the security level of the chain of microservices in response to the chain of microservices not receiving confidential information for at least a threshold amount of time. In addition to security module 127, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and security module 127, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the security module 127 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the security module 127 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
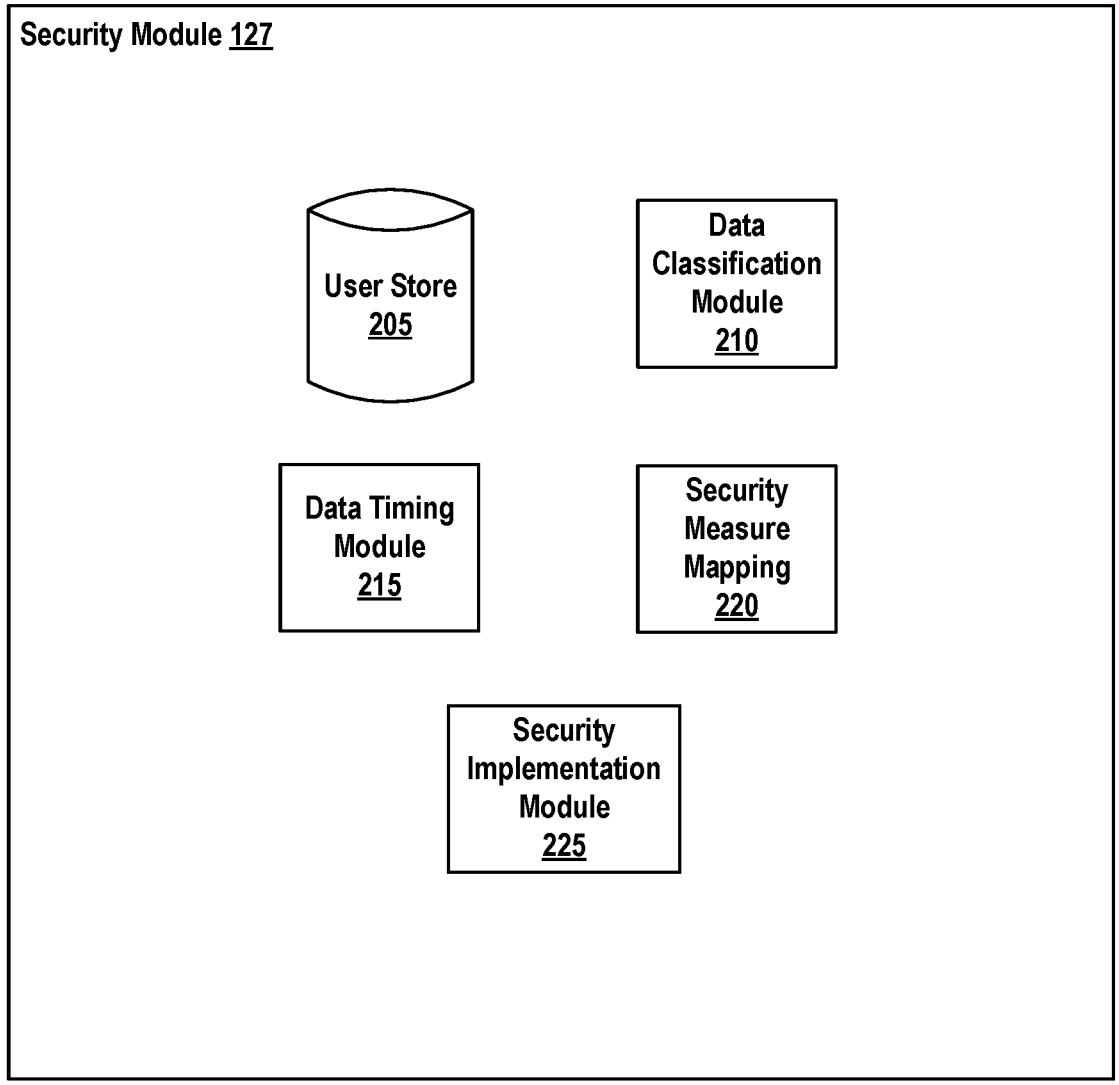
FIG. 2 is a block diagram of a security implementation module, according to some embodiments of the present disclosure.

For further illustration, FIG. 2 is a block diagram of an example embodiment of a security module 127. The security module 127 can include one or more modules or components. Components or modules comprising the security module 127 may be an application specific integrated circuit (ASIC), an electronic circuit, a processor (shared, dedicated, or group) and/or memory that executes one or more software or firmware programs, a combinational logic circuit, and/or other suitable components that provide the described functionality. As can be appreciated, the modules shown can be combined and/or further partitioned in different embodiments. In the example of FIG. 2, the security module 127 includes a user store 205, a data classification module 210, a data timing module 215, a security measure mapping 220, and a security implementation module 225. However, in other embodiments, the security module 127 may include different or additional modules than those described in conjunction with FIG. 2.

The user store 205 includes information identifying different users and one or more chains of microservices used by a user. For example, the user store 205 maintains a user profile for each user. The user profile for a user includes a user identifier that uniquely identifies a user, information identifying one or more chains of microservices used by the user, and one or more times when the user accessed different chains of microservices. A microservice is a service or a functionality provided by an application, with different microservices corresponding to different services provided by the application. Different microservices communicate with each other through one or more lightweight protocols to exchange information, allowing multiple microservices to be used to complete an action or a transaction. For example, an output of a microservice is input to another microservice. In various embodiments, data is transmitted from microservice to microservice using a network, such as public cloud 105 or private cloud 106. As further described below, one or more security measures are applied to prevent unauthorized access to data while a microservice processes the data. The method described herein allows one or more security measures to be applied to a chain of microservices to prevent unauthorized access to data while a microservice is applied to the data and while the data is communicated to different microservices in a chain.

In some embodiments, microservices communicate with each other through a service mesh. The service mesh includes a data plane that exchanges data between microservices, as well as a control plane that describes routing of data between microservices (e.g., rules specifying data flow between microservices) and functional data describing communication between microservices, such as timeout information or other information describing exchange of data between microservices. In other embodiments, microservices exchange data with each other using different architectures subject to one or more rules describing or regulating data transmission between different microservices.

A chain of microservices (or a "microservice chain") identifies multiple microservices. In some embodiments, the chain of microservices also identifies an order in which data is received by different microservices in the chain, providing a description of data flow between microservices in the chain. In some embodiments, the user profile includes a chain identifier identifying a microservice chain that is associated with a user identifier for a user for whom the microservice chain was accessed. A a chain identifier uniquely identifies a microservice chain to simplify subsequent identification of the microservice chain.

The user store 205 generates a user profile for a user based on interactions by the user with an application or with one or more applications. As the user inputs data to the application or requests functionality from the application, the user profile for the user is updated to identify a chain of microservices retrieved or accessed by the application and to identify a time when the chain of microservices was retrieved or accessed. This allows the user profile for a user to include chains of microservices that correspond to interactions by the user. In various embodiments, a user profile for a user is generated during a training interval where user interactions are monitored and chains of microservices corresponding to different user interactions are identified and stored. In some embodiments, the user profile for a user includes one or more chains of microservices that correspond to data received from a user and where at least one microservice in the chain includes data having at least a threshold level of confidentiality. Such an embodiment allows the user profile to identify chains of microservices for a user that warrant application of heightened security measures to protect the data having at least the threshold level of confidentiality.

The data classification module 210 analyzes data that a user inputs into one or more microservice chains and determines a level of confidentiality of the input data. In some embodiments, a service mesh routes data between different microservices and receives data for routing to one or more microservices. The data classification module 210 obtains data provided to the service mesh and applies one or more methods for data classification to the data to determine a level of confidentiality of data in different embodiments. In other embodiments, the data classification module 210 obtains data input into an initial microservice of a chain of microservices and determines the level of confidentiality of the data through one or more data classification models. The one or more data classification models applied to the data classification module 210 are automatic in various embodiments, allowing the data classification module 210 to determine a level of confidentiality of data from a user without receiving input from the user or from another user. For example, a data classification method is context based and determines a level of confidentiality of data by inspecting or interpreting the data itself. As another example, a data classification method is context based that determines a level of confidentiality of data based on attributes of the data (e.g., an application receiving the data, a location of the data, a user from whom the data is received, etc.). In other example, a level of confidentiality of data is determined from the data itself as well as attributes of the data.

For a user, the data classification module 210 identifies a time when data was received from the user and a level of confidentiality for the received data. In some embodiments, the data classification module 210 identifies times when data having at least a threshold level of confidentiality was received from a user. In some embodiments, the data classification module 210 does not identify times when data having less than the threshold level of confidentiality was received from the user. For example, the data classification module 210 identifies times when data having a level of confidentiality of restricted was received from a user and identifies times when data having a level of confidentiality of private was received from a user; however, the data classification module 210 does not identify times when data having a level of confidentiality of public was received from the user in some embodiments. The data classification module 210 stores a user identifier, a time, and a determined level of confidentiality of data received at the time by the user in some embodiments. This allows the data classification module 210 to maintain a record for a user of times when data having different levels of confidentiality were received form the user. In some embodiments, the data classification module 210 stores a user identifier for a user, a level of confidentiality of data received from the user, a time when the data having the level of confidentiality was received, and a chain identifier of a chain of microservices that received the data. In various embodiments, the data classification module 210 determines a level of confidentiality of data each time data is received from a user, allowing the data classification module 210 to continuously monitor data received from various users and to monitor levels of confidentiality for data received from different users.

Based on data from the data classification module 210, the data timing module 215 determines predicted times for a user when data having one or more levels of confidentiality is received from the user. The data timing module 215 selects a user and retrieves information from the data classification module 210 for the selected user. For example, the retrieved information includes a set of times when data was received from the user and corresponding levels of confidentiality for data received from the user at times in the set of times. In some embodiments, the data classification module 210 selects a specific level of confidentiality along with the selected user and determines times when data having the specific level of confidentiality was received from the selected user. From the determined times, the data timing module 215 determines one or more predicted time intervals when data having the specific level of confidentiality was received from the selected user. In some embodiments, the data timing module 215 determines a time associated with a level of confidentiality and with a user in response to detecting receipt of data having the level of confidentiality from the user at the time with at least a threshold frequency or in response to detecting receipt of data having the level of confidentiality from the user at the time at least a threshold amount of times. Various methods for historical analysis may be applied to the data timing module 215 to determine a time associated with a user and with a level of confidentiality. For example, the data timing module 215 determines one or more predicted time intervals when data having a restricted level of confidentiality is received from a specific user. Similarly, the data timing module 215 determines one or more additional predicted time intervals when data having a private level of confidentiality is received from the specific user. The data timing module 215 stores predicted time intervals for a user in association with a user identifier and a level of confidentiality. This allows the data timing module 215 to leverage historical data from a user to identify predicted time intervals when data having a particular level of confidentiality is received from a user.

The security a security measure mapping 220 stores associations between one or more security measures and levels of security. For example, a first set of security measures are associated with a level of confidentiality, and a second set of security measures associated with a second level of confidentiality. Higher levels of confidentiality have higher security measures to provide increased protection to data with the higher levels of confidentiality. For example, a highest level of confidentiality corresponds to implementation of a network intrusion detection protection system (NIDPS). In another example, a highest level of confidentiality corresponds to implementation of a mutual transport layer security (MTLS) system. In various implementations, lower levels of confidentiality correspond to less stringent security measures. Hence, different security measures are implemented for transmission or exchange of data having different levels of confidentiality, providing different amounts of protection of data from unauthorized access. As more stringent security measures are more computationally intensive, applying different security measures for data with different levels of confidentiality allows data to be protected while efficiently using available computational resources.

The security implementation module 225 selects one or more security measures to implement for a chain of microservices for a user during the predicted time interval based on the security measure mapping 220 and one or more predicted time intervals stored in association with the user by the data timing module 215. For a user, the security implementation module 225 retrieves a predicted time interval and a particular level of confidentiality for the user for the predicted time interval. As the predicted time interval specifies a time interval when data having the particular level of confidentiality is likely to be received from the use, the security implementation module 225 determines one or more security measures corresponding to the particular level of confidentiality for one or more chains of microservices associated with the user and with the predicted time interval and implements the determined one or more security measures for the one or more chains of microservices associated with the user during the predicted time interval starting a threshold amount of time from a predicted time interval corresponding to the particular level of confidentiality. In various implementations, the threshold amount of time before the predicted time interval is based on the one or more security measures, and different security measures may be associated with the different threshold amounts of time. Implementing a security measure to a chain of microservices the threshold amount of time before the predicted time interval allows the security measure to be operational when the predicted time interval begins, so data received from the user at the start of the predicted time interval is protected by one or more security measures. This reduces a likelihood of a portion of the data transmitted at the start of the predicted time interval being compromised.

Additionally, using a level of confidentiality of data for a predicted time interval and one or more chains of microservices associated with the user during the predefined time interval allows the security implementation module 225 to proactively implement one or more security measures for the one or more chains of microservices at a time interval based on a level of confidentiality of data likely to be received from the user during the time interval. When the predicted time interval lapses, the security implementation module 225 implements an alternative security measure. For example, a security measure corresponding to a lower level of confidentiality is implemented once the predicted time interval lapses. In some implementations, one or more default security measures are implemented after the predicted time interval ends. This allows security measures to be increased for one or more predicted time intervals based on a level of confidentiality of data, allowing protection of data during a predicted time interval, while conserving computational resources by implementing alternative (such as less computationally intensive) security measures outside of the predicted time interval.

For security measures that are unable to implemented for a specific user during the predicted time interval, the security implementation module 225 implements a security corridor for one or more chains of microservices associated with the user and the predicted time interval. The security corridor includes replicas of the one or more chains of microservices, with the security measures determined for the user during the predicted time interval implemented for the replicas of the one or more chains of microservices. This allows the security implementation module 225 to direct data from the user during the predicted time interval to the replica of the chain of microservices where the one or more security measures are implemented. Data from other users during the predicted time interval is directed to the chain of microservices where the one or more security measures are not implemented. This allows the security implementation module 225 to apply one or more security measures to a replica of a chain of microservices for the user during the predicted time interval, while the one or more security measures are not applied to the chain of microservices. Data having the level of confidentiality the level of confidentiality mapped to the one or more security measures applied to the replica of the chain of microservices during the predicted time interval. However, data associated with other levels of confidentiality is directed to the chain of microservices where the one or more security measures are not applied.

In some embodiments, the data classification module 210 monitors data received and determines a level of confidentiality of received data, as further described above. The data classification module 210 transmits a determined level of confidentiality of received data and a time when the data was received to the security implementation module 225. During a predicted time interval corresponding to a particular level of confidentiality, the security implementation module 225 determines an amount of time between receipt of different data having the particular level of confidentiality. In some embodiments, in response to the amount of time between receipt of different data having the particular level of confidentiality equaling or exceeding a threshold value, the security implementation module 225 modifies the one or more security measures that are implemented. For example, in response to the amount of time between receipt of different data having the particular level of confidentiality equaling or exceeding a threshold value, the security implementation module 225 implements one or more security measures corresponding to a different level of confidentiality that is less than the particular level of confidentiality. This allows the security implementation module 225 to adjust one or more security measures implemented during predicted time interval based on a frequency or duration between receipt of data having the particular level of confidentiality, further conserving computational resources by reducing an amount of time that computationally-intensive security measures are implemented. In other embodiments, the security implementation module 225 implements the one or more security measures corresponding to the particular level of confidentiality for the predicted time interval for a complete duration of the predicted time interval.

In some embodiments, the data classification module 210 monitors data received and determines a level of confidentiality of received data, as further described above. In response to the security implementation module 225 receiving an indication from the data classification module 210 that data having a higher level of confidentiality than a current level of confidentiality for which one or more security measure are currently implemented is received from a user, the security implementation module 225 determines a chain of microservices based on the user and the time when the data was received from the user store 205. This allows the security implementation module 225 to determine a chain of microservices through which the data will traverse based on times when data previously received from the user were propagated through chains of microservices. The security implementation module 225 modifies one or more security measures applied to microservices in the determined chain of microservices to implement one or more security measures mapped to the higher level of confidentiality identified by the data classification module 210. This allows the security implementation module 225 to increase one or more security measures for multiple microservices in a chain of microservices associated with the user during a time when data having a particular level of confidentiality was received from the user, allowing proactive increasing of the security measures that are implemented when data having a particular level of confidentiality is received. Leveraging the information in the user store 205 identifying one or more chains of microservices associated with the user and times when the user accessed the chains of microservices allows the security implementation module 225 to implement security measures across multiple microservices through which data having the particular level of confidentiality is likely to traverse. In some embodiments, in response to an amount of time between receipt of different data having the higher level of confidentiality equaling or exceeding a threshold value, the security implementation module 225 modifies the one or more security measures that are implemented. For example, in response to the amount of time between receipt of different data having the higher level of confidentiality equaling or exceeding a threshold value, the security implementation module 225 implements one or more security measures corresponding to a different level of confidentiality that is less than the particular level of confidentiality. This allows the security implementation module 225 to dynamically adjust the security measures that are implemented based on a level of confidentiality of data that was received from a user.

Figure 3:
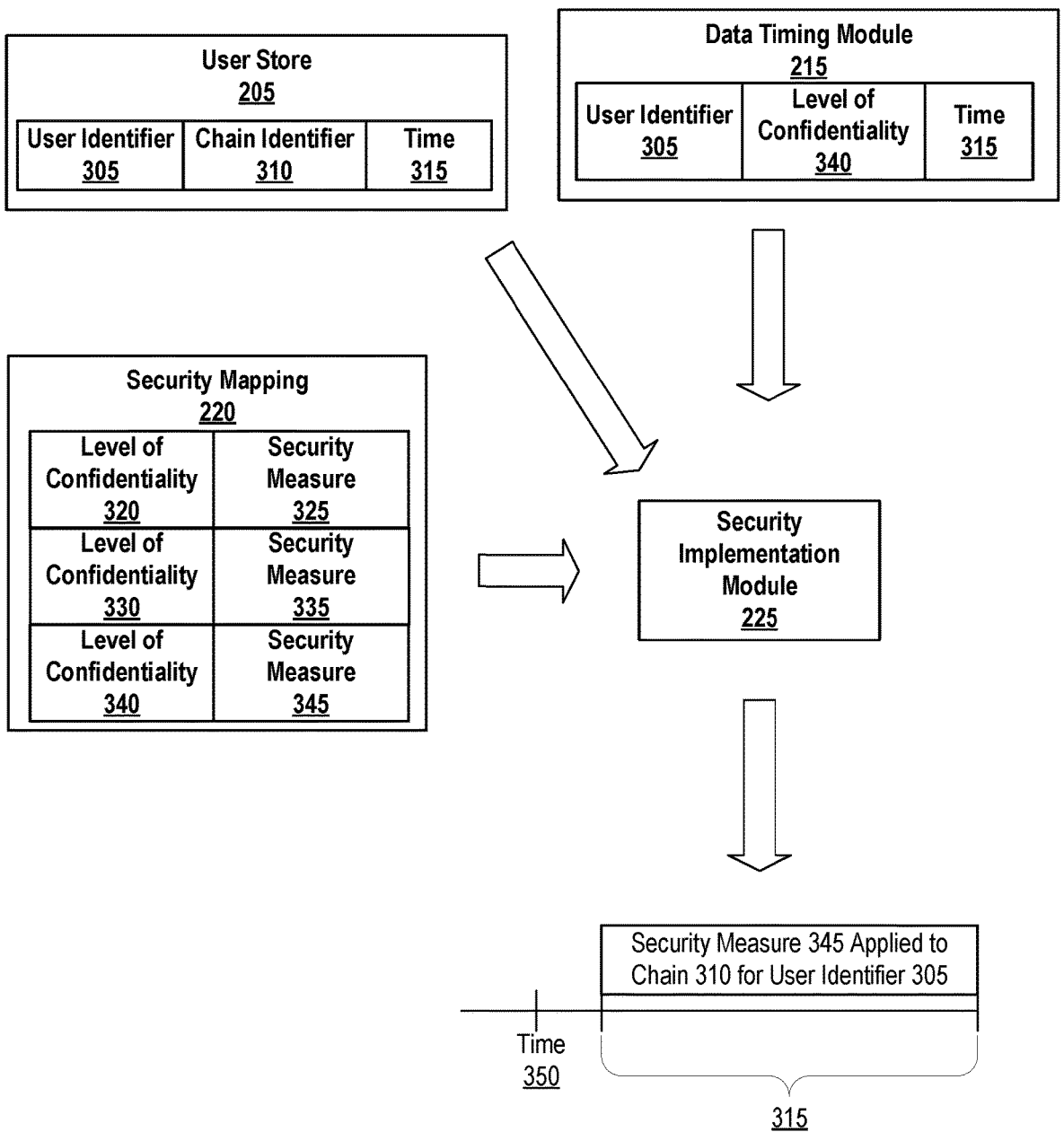
FIG. 3 is a process flow diagram of applying one or more measures of security to a chain of microservices based on a level of confidentiality of data received during a time, according to some embodiments of the present disclosure.

For further illustration, FIG. 3 shows a process flow diagram of the security module 127 implementing a security measure for a chain of microservices during a predicted time interval. In the example shown by FIG. 3, the user store 205 including data for a single user. The user store 205 includes a user identifier 305 uniquely identifying a user and a chain identifier 310 and a time 315 associated with the user identifier. The chain identifier 310 uniquely identifies a chain of microservices. In some embodiments, the chain identifier 310 is the chain of microservices, while in other embodiments the chain identifier 310 is other information that is uniquely associated with a chain of microservices. The time 315 identifies a time when the user corresponding to the user identifier 305 provided data to the chain of microservices corresponding to the chain identifier 310. In some embodiments, the time 315 is a time interval during which the user provided data to the chain of microservices. As further described above in conjunction with FIG. 2, the data in the user store 205 for users is generated based on interactions by users during a training interval, allowing the chain identifier 310 and the time 315 associated with the user identifier 305 to reflect interactions performed by the user corresponding to the user identifier 305 over time.

Additionally, FIG. 3 shows an example content of the data timing module 215. For purposes of illustration, FIG. 3 shows data stored by the data timing module 215 for the user corresponding to the user identifier 305. In the example of FIG. 3, the data timing module 215 stores a level of confidentiality 320 in association with the user identifier 305. Additionally, the data timing module 215 stores time 315 in association with the user identifier 305 and the level of confidentiality 320, indicating that data received from the user during time 315 has level of confidentiality 320. As further described above in conjunction with FIG. 2, the data classification module 210 determines a level of confidentiality of data received from the user, with a level of confidentiality determined for data stored in association with a user identifier 305 of the user from whom the data was received and a time 315 when the data was received from the user. This allows the data timing module 215 to identify time intervals when data having the level of confidentiality 320 was received from the user corresponding to the user identifier 305. While FIG. 3 shows data for a single combination of user identifier 305 and time 315, the data timing module 215 includes data for multiple users and for multiple times, allowing the data timing module 215 to identify different times when users provided data having various levels of confidentiality.

As further described above in conjunction with FIG. 2, the security measure mapping 220 stores relationships between levels of confidentiality and security measures applied to protect data having a level of confidentiality. For purposes of illustration, FIG. 3 shows the security measure mapping 220 including three levels of confidentiality—level of confidentiality 320, level of confidentiality 330, and level of confidentiality 340. However, in other embodiments, the security measure mapping 220 includes any number of levels of confidentiality. Different levels of confidentiality correspond to different security measures, with some security measures providing increased protection for data than other security measures. In the example of FIG. 3, security measure 325 corresponds to level of confidentiality 320, security measure 335 corresponds to level of confidentiality 330, while security measure 345 corresponds to level of confidentiality 340.

For purposes of illustration, level of confidentiality 320 is a lowest level of confidentiality, while level of confidentiality 340 is a highest level of confidentiality. Hence, security measure 345, which corresponds to level of confidentiality 340, provides increased protection for data relative to security measure 325, which corresponds to level of confidentiality 320. Because security measure 345 provides increased protection for data, implementing security measure 345 is more computationally intensive than implementing security measure 325 or security measure 335. For example, security measure 345 is a network intrusion detection and prevention system to increase security of data having level of confidentiality 340. As another example, security measure 345 is mutual transport layer security (MTLS) between microservices. As security measure 345 is computationally intensive, reducing an amount of time when it is implemented conserves computational resources and network resources, increasing overall efficiency.

As further described above in conjunction with FIG. 2, the security implementation module 225 leverages information about a user from the user store 205 and from the data timing module 215 to selectively implement a security measure for a user during one or more time intervals. Based on data associated with a user in the data timing module 215, the security implementation module 225 determines a time when data having a particular level of confidentiality is received from the user. In the example of FIG. 3, the security implementation module 225 determines that data having level of confidentiality 340 is received from the user corresponding to user identifier 305 during time 315. This allows the security implementation module 225 to leverage information about data previously received from a user to identify one or more time intervals when data having the particular level of confidence is received from the user.

As the chain of microservices through which data received from a user is routed is determined by an application or a service that receives the data, the security implementation module 225 leverages information associated with a user from the user store 205 to identify one or more chains of microservices that were accessed or used for data received from a user at one or more times based on prior interactions by the user. As an application determines the chain of microservices through which data from a user traverses, prior interactions by the user with the application allows the user store 205 to identify one or more chains of microservices through which data from the user is directed. This allows the user store 205 to identify a chain of microservices applicable to data received from a user at one or more times. Generating data for a user in the user store 205 based on interactions by the user allows chains of microservices stored in association with the user to reflect data flow for data received from the user, allowing one or more security measures to be applied to a chain of microservices through which data from a use is routed rather than to a specific microservice that received data from the user.

For a user and a particular time, the security implementation module 225 determines one or more chains of microservices associated with the user and the particular time from the user store 205. So, for a combination of a time and a user, the security implementation module 225 determines one or more chains of microservices and a level of confidentiality associated with the time and the user. Referring to the example of FIG. 3, for time 315 and user identifier 305, the security implementation module 225 retrieves chain identifier 310 and level of confidentiality 340 from the user store 205 and from the data timing module 215, respectively. Thus, in the example of FIG. 3, during time 315, the user provides data having level of confidentiality 340, and the data traverses the chain of microservices corresponding to chain identifier 310. To protect the data according to its level of confidentiality, for the user, the security implementation module 225 implements security measure 345 for the chain of microservices corresponding to chain identifier 310 during time 315. This allows security measure 345 to be enforced during time 315 for the chain of microservices corresponding to chain identifier 310, allowing data from the user to be protected with the security measure corresponding to the level of confidentiality for the user during time 315. In some embodiments, the security implementation module 225 begins initializing security measure 345 at time 350, which is a threshold amount of time before a start of time

315. The threshold amount of time is based on a time to implement security measure 345, allowing security measure 345 to be implemented at the beginning of time 315, allowing data from the user to be protected via security measure 345 once time 315 begins. For example, security measures 345 is a network intrusion detection protection system (NIDPS), so time 350 is based on an amount of time to configure NIDPS, so NIDPS is fully configured and operational at the beginning of time 315. In another example, security measure 345 is a mutual transport layer security (MTLS) system, so time 350 is based on an amount of time to configure MLTS between each microservice in the chain of microservices corresponding to chain identifier 310. This allows MTLS to be configured and operational at the beginning of time 315, rather than having a portion of time 315 used for configuring MTLS (or for configuring security measure 345).

As shown in FIG. 3, time 315 is a time interval, with security measure 345 implemented for the time interval. After time 315 is completed, the security implementation module 225 modifies the security measure to implement a different security measure after time 315. The different security measure is less computationally intensive than the security measure implemented during the time interval. In some embodiments, the security implementation module 225 modifies the security measure during the time interval comprising time 315 in response to security implementation module 225 determining that at least a threshold amount of time has passed from receipt of data from the user having level of confidentiality 340. This allows data from the user to be protected with more stringent security measure during the time 315, based on prior data received from the user during time 315, while relaxing the security measure applied for the user after the time 315 lapses to conserve computational resources.

Figure 4:
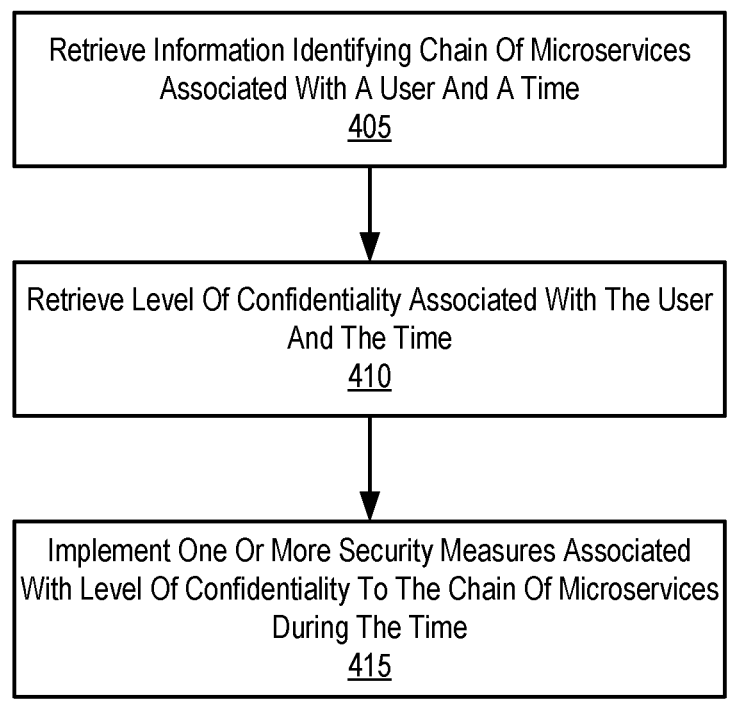
FIG. 4 is a flowchart of a method for applying one or more measures of security to a chain of microservices based on a level of confidentiality of data received during a time, according to some embodiments of the present disclosure.

FIG. 4 is a flowchart of one embodiment of a method for implementing a security measure for a chain of microservices during a predicted time interval according to embodiments of the present disclosure. In contrast to conventional methods where a security measure is implemented after receiving data having a level of confidentiality corresponding to a security measure, the method described in conjunction with FIG. 4 leverages prior interactions by a user to determine a level of confidentiality of data received from a user during a time and to implement a security measure corresponding to the determined level of confidentiality at the time. Additionally, the method described in conjunction with FIG. 4 applies a security measure to multiple microservices in a chain of microservices, protecting data with the security measure as the data is routed between microservices in the chain of microservices.

For a user, the method retrieves 405 information identifying a chain of microservices associated with the user and a time when the user provides data to the chain of microservices. As further described above in conjunction with FIG. 2, the information associated with the user is generated and stored based on prior interactions by the user. For example, during a training interval, interactions by the user are monitored and recorded. During the training interval, times when the user provided data are recorded, and a chain of microservices that received data from the user is associated with the user and with a time when data was received. For example, a chain identifier of a chain of microservices is stored in association with a day of the week and a time when data from the user was input to the chain of microservices. In various embodiments, a user identifier uniquely identifying the user is stored in association with the chain identifier and the time when data from the user was input to a chain of microservices corresponding to the chain identifier. After the training interval, interactions by the user are analyzed and used to generate information that identifies times when the user provides data and a chain of microservices that receives the data from the user at different times. For example, data from the training interval is analyzed to identify times when data was received from the user with at least a threshold frequency, and the identified times are stored in association with a user identifier of the user and in association with information identifying a chain of microservices that received the data from the user at an identified times. This allows the training interval to observe a user's interactions and to identify times when data is received from the user and which chain of microservices receives data from the user at one or more identified times.

In various embodiments, the method identifies a user identifier of a user and retrieves 405 a time when the user provides data and a corresponding chain of microservices for the time that are associated with the user identifier. For example, the method retrieves 405 a day of the week and a time, such as a time interval, associated with a user identifier for the user and a chain of microservices associated with the user identifier and the day of the week and the time. This allows the method to retrieve 405 a time when the user provides data and a chain of microservices that receives the data from the user during the time, based on historical interactions by the user.

As further described above in conjunction with FIG. 2, data from a user has a level of confidentiality, with a security measure implemented to protect data based on the level of confidentiality of the data. Different security measures are implemented for different levels of confidentiality. As different security measures consume different amounts of computational resources, limiting an amount of time when certain security measures are implemented conserves overall computational resources. To provide sufficient protection for data from the user during the time associated with the user, the method retrieves 410 a level of confidentiality associated with the user and with the time. As further described above in conjunction with FIGS. 2 and 3, the level of confidentiality associated with the user and with the time is determined based on interactions by the user performed during a training interval. A level of confidentiality for data received from a user is determined, and a time when data was received from a user is stored in association with the user (e.g., with a user identifier) and with a level of confidentiality for the data. This maintains information identifying a level of confidentiality of data received from a user during one or more times.

The method accounts for the level of confidentiality of data from the user during the time by retrieving 410 a level of confidentiality associated with the user and with the time. This allows the method to retrieve both a level of confidentiality of data from the user during the time and a chain of microservices through which data received from the user during the time is routed. For example, the time is a time interval, so the method retrieves 405 a chain of microservices for the user during the time interval and a level of confidentiality associated with the user and the time interval.

To protect data from the user during the time, the method implements 415 one or more security measures corresponding the level of confidentiality during the time for each microservice of the chain of microservices associated with the user and with the time. Implementing the one or more security measures for each microservice of the chain of microservices allows data to be protected by the one or more security measures when being exchanged between microservices in the chain, providing additional protection for the data. In some embodiments, the method begins configuring the one or more security measures at an initialization time that is a threshold amount of time before the time. Beginning configuration of the one or more security measures at the initialization time allows the one or more security measures to be operational at the time so data received during the time is protected by the one or more security measures at the beginning of the time.

In various embodiments, after the time lapses (e.g., after a time interval ends), the method applies one or more alternative security measures to the chain of microservices. For example, the alternative security measures are less computationally intensive than the one or more security measures corresponding to the level of confidentiality during the time. As an example, the one or more alternative security measures correspond to lower levels of confidentiality than the one or more security measures applied during the time. In various embodiments, the method applies the one or more alternative security measures in response to not detecting data from the user having the level of confidentiality for at least a threshold amount of time. Such an embodiment allows the method to further conserve computational resources by applying the alternative security measures during the time in response to not receiving data from the user having the level of confidentiality corresponding to the one or more security measures for at least the threshold amount of time.

In some embodiments, one or more security measures applied to a chain of microservices is dynamically modified based on a level of confidentiality detected for data received by the chain of microservices. In response to detecting data having the level of confidentiality being received by a microservice in the chain, one or more security measures corresponding to the level of confidentiality are applied to each microservice in the chain, increasing protection of the chain of microservices to correspond to the detected level of confidentiality. In response to not detecting additional data having the level of confidentiality for at least a threshold amount of time, the lone or more security measures corresponding to the level of confidentiality are no longer applied. This allows security measures for a chain of microservices to be dynamically modified based on a level of confidentiality of data received by the chain of microservices, providing protection for data commensurate with the level of confidentiality of the data, while limiting application of the security measures corresponding to the level of confidentiality based on a duration when data having the level of confidentiality is received.

Leveraging prior interactions by a user to determine times when the user provides data having different levels of confidentiality and times when a chain of microservices is accessed by a user allows identification of a chain of microservices and a level of confidentiality of data from the user at one or more times. This allows security measures corresponding to a level of confidentiality of data from a user to be proactively implemented for a chain of microservices at a time when the user accesses the chain of microservices based on the level of confidentiality of data received from the user at the time. Such time-specific configuration of security measures based on an expected level of confidentiality of data from a user allows security measures to be implemented at times when they are most likely to be needed, allowing computational resources to be conserved by tailoring application of security measures to particular time intervals. Further, applying a security measure to each microservice in a chain of microservices increases protection of data by protecting the data as it traverses to different microservices in a chain, rather than protecting data for a specific microservice in the chain.

Exemplary embodiments of the present invention are described largely in the context of a fully functional computer system for performing a context switch by replacing an address translation context used by the computer processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for protecting data from a user when traversing a chain of microservices, the method comprising:
   retrieving information identifying the chain of microservices associated with a user identifier of the user and a predicted time when the user will provide data to the chain of microservices;
   retrieving a level of confidentiality stored in association with the user identifier of the user and the predicted time; and
   implementing one or more security measures corresponding to the stored level of confidentiality for each microservice of the chain of microservices during the predicted time.

2. The method of claim 1, further comprising:
   implementing an alternative security measure for each microservice of the chain of microservices after the time.

3. The method of claim 2, wherein the alternative security measure corresponds to a lower level of confidentiality than the level of confidentiality.

4. The method of claim 1, further comprising:
   implementing an alternative security measure for each microservice of the chain of microservices after the time in response to at least a threshold time passing from receipt of data having the level of confidentiality from the user.

5. The method of claim 1, wherein retrieving information identifying the chain of microservices associated with the user identifier of the user and the time when the user provided data to the chain of microservices comprises:
   monitoring interactions by the user during a training interval;

storing one or more times when data was received from the user during the training interval in association with the user identifier;

identifying one or more chains of microservices retrieved for the user in response to data received from the user;

storing an identified chain of microservices retrieved for corresponding data received from the user in association with a time when the data was received and the user identifier; and retrieving the identified chain of microservices and the time when data was received based on the user identifier.

6. The method of claim 1, wherein retrieving the level of confidentiality in association with the user identifier of the user and the time comprises:

determining a level of confidentiality for data received from the user during a training interval;

storing a time when data was received and a level of confidentiality determined for the data in association with a user identifier; and retrieving the identified level of confidentiality associated with the user identifier and the time when data was received based on the user identifier.

7. The method of claim 1, wherein implementing one or more security measures corresponding to the stored level of confidentiality for each microservice of the chain of microservices during the time comprises:

configuring the one or more security measures at an initialization time that is a threshold amount of time before the time.

8. The method of claim 7, wherein the threshold amount of time is based on at least one of the one or more security measures.

9. The method of claim 1, wherein implementing one or more security measures corresponding to the stored level of confidentiality for each microservice of the chain of microservices during the time comprises:

generating a replica of the chain of microservices; and implementing the one or more security measures corresponding to the stored level of confidentiality for each microservice of the replica of the chain of microservices during the time.

10. An apparatus for protecting data from a user when traversing a chain of microservices, the apparatus comprising a computer processor, a computer memory operatively coupled to the computer processor, the computer memory having disposed within it computer program instructions that, when executed by the computer processor, cause the apparatus to carry out steps of:

retrieving information identifying the chain of microservices associated with a user identifier of the user and a predicted time when the user will provide data to the chain of microservices;

retrieving a level of confidentiality stored in association with the user identifier of the user and the predicted time; and implementing one or more security measures corresponding to the stored level of confidentiality for each microservice of the chain of microservices during the predicted time.

11. The apparatus of claim 10, wherein the steps further comprise:

implementing an alternative security measure for each microservice of the chain of microservices after the time.

12. The apparatus of claim 11, wherein the alternative security measure corresponds to a lower level of confidentiality than the level of confidentiality.

13. The apparatus of claim 10, wherein implementing one or more security measures corresponding to the stored level of confidentiality for each microservice of the chain of microservices during the time comprises:

configuring the one or more security measures at an initialization time that is a threshold amount of time before the time.

14. The apparatus of claim 13, wherein the threshold amount of time is based on at least one of the one or more security measures.

15. A computer program product for protecting data from a user when traversing a chain of microservices, the computer program product disposed upon a computer readable medium, the computer program product comprising computer program instructions that, when executed, cause a computer to carry out steps of:

retrieving information identifying the chain of microservices associated with a user identifier of the user and a predicted time when the user will provide data to the chain of microservices;

retrieving a level of confidentiality stored in association with the user identifier of the user and the predicted time; and implementing one or more security measures corresponding to the stored level of confidentiality for each microservice of the chain of microservices during the predicted time.

16. The computer program product of claim 15, wherein the computer readable medium further comprises computer program instructions that, when executed, cause the computer to carry out steps of:

implementing an alternative security measure for each microservice of the chain of microservices after the time.

17. The computer program product of claim 16, wherein the alternative security measure corresponds to a lower level of confidentiality than the level of confidentiality.

18. The computer program product of claim 15, wherein the computer readable medium further comprises computer program instructions that, when executed, cause the computer to carry out steps of:

implementing an alternative security measure for each microservice of the chain of microservices after the time in response to at least a threshold time passing from receipt of data having the level of confidentiality from the user.

19. The computer program product of claim 15, wherein implementing one or more security measures corresponding to the stored level of confidentiality for each microservice of the chain of microservices during the time comprises:

configuring the one or more security measures at an initialization time that is a threshold amount of time before the time.

20. The computer program product of claim 19, wherein the threshold amount of time is based on at least one of the one or more security measures.

* * * * *